United States Patent [19]

Sato et al.

[11] Patent Number: 5,360,835
[45] Date of Patent: Nov. 1, 1994

[54] RADIATION-CURABLE POLYURETHANE EMULSION COMPOSITIONS

[75] Inventors: Kazuo Sato, Ohtsu; Tadayuki Sugimoto, Kyoto; Naofumi Saiuchi, Shiga, all of Japan

[73] Assignee: Dai-Ichi Kogyo Seiyaku Co., Ltd., Kyoto, Japan

[21] Appl. No.: 160,045

[22] Filed: Nov. 30, 1993

[30] Foreign Application Priority Data

Dec. 1, 1992 [JP] Japan ................... 4-321632

[51] Int. Cl.$^5$ ............ C08F 2/46; C08G 18/63; C08G 18/81
[52] U.S. Cl. ......................... 522/85; 522/86; 522/90; 522/96; 522/97; 522/98; 522/149; 524/457; 524/591; 524/839
[58] Field of Search .......... 522/85, 86, 90, 96, 522/174, 173, 149, 97, 98; 524/457, 839, 591

[56] References Cited

U.S. PATENT DOCUMENTS

| | | | |
|---|---|---|---|
| 3,928,271 | 12/1975 | Matsuda et al. | 260/29.2 TN |
| 4,008,196 | 2/1977 | Matsuda et al. | 260/29.2 TN |
| 4,012,349 | 3/1977 | Matsuda et al. | 260/29.2 TN |
| 4,016,121 | 4/1977 | Matsuda et al. | 524/591 |
| 4,339,566 | 7/1982 | Rosenkranz et al. | 522/96 |
| 4,425,472 | 1/1984 | Howard et al. | 522/96 |
| 4,722,966 | 2/1988 | Flakus | 524/840 |
| 4,745,151 | 5/1988 | Noll et al. | 524/591 |
| 4,992,507 | 2/1991 | Coogan et al. | 524/839 |
| 5,011,881 | 4/1991 | Fujii et al. | 524/457 |
| 5,124,400 | 6/1992 | Tirgak et al. | 528/76 |
| 5,135,963 | 8/1992 | Haeberle | 528/75 |
| 5,137,961 | 8/1992 | Goos et al. | 524/457 |
| 5,173,526 | 12/1992 | Vijayendran et al. | 524/457 |
| 5,200,463 | 4/1993 | Flakus | 522/90 |

FOREIGN PATENT DOCUMENTS

| | | |
|---|---|---|
| 49-99194 | 9/1974 | Japan. |
| 62-22816 | 1/1987 | Japan. |

*Primary Examiner*—Susan W. Berman
*Attorney, Agent, or Firm*—Marshall, O'Toole, Gerstein, Murray & Borun

[57] ABSTRACT

Radiation-curable polyurethane emulsion compositions that can be diluted with water are disclosed. An emulsion of a polyurethane having active amino groups is prepared, and the emulsion is reacted, in the presence of water, with an isocyanate compound having a polymerizable unsaturated group to introduce the polymerizable unsaturated group into the polyurethane. The introduction of a polymerizable unsaturated group into the polyurethane is accomplished in the presence of water, thereby overcoming prior art problems of polymerization and gelation during the preparation of the emulsion. The present invention provides radiation-curable polyurethane emulsion compositions that can be produced on an industrial scale.

27 Claims, No Drawings

RADIATION-CURABLE POLYURETHANE EMULSION COMPOSITIONS

FIELD OF THE INVENTION

The present invention relates to radiation-curable polyurethane emulsion compositions that polymerize when irradiated with a variety of radiation types.

BACKGROUND OF THE INVENTION

Polyurethane resins have been used extensively as a useful material in adhesives, coating materials and as resin modifiers. In addition, recently, the use of synthetic resins, either water-soluble or in the form of water-based emulsions, has increased because resins synthesized or solubilized in a nonaqueous solvent system pose environmental and toxicological problems because the solvent is released into the atmosphere. In the field of polyurethane resins, water-soluble polyurethanes and water-based emulsion-type polyurethanes are used increasingly in adhesives, coatings, and other practical applications in place of a conventional polyurethane dissolved in an organic solvent. In addition, new applications for water-based polyurethanes are being investigated extensively. In short, the application of water-based polyurethane resins, both water-solution types and water-emulsion types, is expanding and is expected to continue expanding in the future.

The water-soluble and water-based emulsion polyurethanes in present-day use include emulsions of thermoplastic polyurethanes of relatively high molecular weight, and comprising mainly straight-chain molecular structures. The emulsions are prepared by introducing an anionic, cationic or nonionic hydrophilic group onto the polyurethane, thereby causing self-emulsification or dispersion, or by adding an emulsifier to a hydrophobic polyurethane resin to induce dispersion and emulsification of the resin in water.

In addition, the use of radiation-curable resins, whereby polymerization is induced by various types of radiation, such as ultraviolet ray or electron beam, recently has been expanding quickly, particularly in the coatings industry, because such resins possess the advantageous property of having a low energy requirement for processing, at a low temperature and in a short time. In the art of radiation-curable resins, nonaqueous radiation-curable resins are the typical and conventional product form.

Nonaqueous radiation-curable resins are designed, as explained above, to allow processing with low amounts of energy, at low temperatures, and in a short time. Therefore, 100% of the components of nonaqueous radiation-curable resins are resin components. The conventional nonaqueous resins incorporate a radiation-curable resin of medium molecular weight, and a large quantity of a low molecular weight component, i.e., a monomer, for adjusting the viscosity to improve application properties. The low molecular weight component is termed a reactive thinner monomer, which include, for example, vinyl acetate, vinylpyrrolidone or an alkylacrylic ester.

Conventional water-soluble and water-based polyurethane emulsions, however, have the following disadvantages. The polyurethane emulsions of the prior art are emulsions of a straight-chain thermoplastic polyurethane of relatively high molecular weight. Therefore, for films derived from such prior polyurethane emulsions, performance improvements are presently needed in, for example, heat-stable adhesion, solvent resistance, and chemical resistance. Moreover, to improve various properties of films derived from conventional polyurethane emulsions, attempts have been made to incorporate a variety of crosslinking agents, for example, a melamine, such as trimethylol melamine, an epoxy or a blocked isocyanate, into the composition. As a result of adding crosslinking agents, some performance improvements have been demonstrated, but composition performance still is generally unsatisfactory. In addition, when crosslinking agents are added to the polyurethane emulsion, it is necessary to use a processing temperature that is higher than the activating temperature of the reactive group of the crosslinking agent. Accordingly, an advantage of the conventional polyurethane emulsions, i.e., the ability to form a film which exhibits good physical properties at the drying temperature of the composition, is eliminated.

The heat resistance of the substrates must be considered. This consideration limits the processing conditions and the scope of applications for the polyurethane emulsion. In short, satisfactory polyurethane emulsions have not been developed yet. Deficiencies in polyurethane performance are attributed primarily to the fact that the above-described prior art polyurethane emulsions lack a functional group that can react with a crosslinking agent. In other words, improvements in conventional polyurethane emulsions by the use of crosslinking agents are limited to improvements in physical properties attributed to polymer chain entanglement, like an interpenetrating polymer network (IPN) between the polyurethane resin and the self-polymerization product of the crosslinking agent.

It, therefore, is a prime goal to develop a polyurethane emulsion that retains the advantages of prior art polyurethane emulsions, i.e., an ability to form a film exhibiting their physical properties when treated with sufficient energy merely for drying the composition, and that also has an ability to form a network structure which overcomes the various disadvantages of the prior art polyurethane emulsions. The development and availability of such a polyurethane emulsion is commercially valuable.

With respect to radiation-curable resins, radiation-induced setting resins of the prior art require the addition of 20 to 70 parts by weight of a low molecular weight reactive thinner monomer to the intermediate molecular weight resin component to adjust composition viscosity and film thickness. The addition of a reactive thinner monomer poses problems with respect to safe storage and with respect to using materials that are harmful to the human body and of objectionable odor.

Furthermore, the polymerization of a large amount of a low molecular weight reactive thinner monomer poses the following problems:

(1) A majority of the cured films, or the substrate, exhibit an odor specific to the radiation-curable resin. The odor is attributed primarily to the reactive thinner monomer and is a very troublesome problem.

(2) The excellent film flexibility attributed to the intermediate molecular weight resin is seriously impaired. This results in film brittleness, which is a defective physical property. The film therefore tends to perform badly.

(3) The large degree of shrink observed when the reactive thinner monomer undergoes curing polymerization causes the problem of poor adhesion between the film and the substrate.

To reduce or completely eliminate such disadvantages, it is necessary to develop both chemical and processing solutions to solve these important problems. One simple solution to the problem of using reactive thinner monomers is the proposed addition of water to reduce the amount of the reactive thinner monomer in the composition. The radiation-curable resins of the prior art, however, are insoluble in water. A small quantity of water can be used or mixed with the prior radiation-curable resins, but a large quantity of water cannot be used. The mere addition of water therefore is not a viable solution. Hence, it presently is a prime goal to develop a water-based radiation-curable resin as a chemical solution to overcome prior unsolved problems.

Japanese Laid-Open Patent Publication No. SHO-62-22816 discloses a water-based ionomer urethane acrylate, and its method of preparation, which was developed to solve the problems of prior art resin compositions. In preparing the ionomer urethane acrylate, a mono-hydroxyl group-containing compound containing a polymerizable unsaturated group first is reacted with an organic polyisocyanate. Then, the residual isocyanate groups are reacted with a polyol compound. Next, an organic solvent, such as acetone, is added, and a carboxyl group is introduced by reacting mono-amino-alkyl carboxylic acid in the presence of water to effect conversion into salt. The resulting product is dispersed in water to provide an emulsion. Finally, the organic solvent is removed under reduced pressure. An ionomer urethane acrylate is prepared by this method.

The above-described method of production generally has the following disadvantages:

(1) After the hydroxyl group-containing compound containing a polymerizable unsaturated group is reacted with the polyisocyanate, a reaction between the residual isocyanate group and the polyol, which requires heating, is needed.

(2) After the emulsion is produced, the solvent is removed under reduced pressure and in the presence of water. During the process of solvent removal, oxygen, which suppresses polymerization of the polymerizable unsaturated group, also is removed.

The above-mentioned disadvantages subject the polymerizable unsaturated groups introduced into the urethane to destabilizing conditions. The destabilizing conditions can induce gelation due to polymerization of the unsaturated group, and pose a serious problem from a viewpoint of industrial production. The problem possibly can be alleviated by either using a powerful inhibitor selected from various commonly-used inhibitors, or using a large quantity of an inhibitor. When such a method is used, however, the rate of polymerization during radiation processing is reduced. This, in turn, reduces the overall processing speed, and creates a new problem.

The present invention solves problems encountered in the prior art. The present invention is directed to providing radiation-curable polyurethane emulsion compositions that do not include solvent, and that form a cured film which is not brittle and has a good adhesion to a substrate.

SUMMARY OF THE INVENTION

A radiation-curable polyurethane emulsion composition of the present invention is obtained by adding (a) an isocyanate compound having a polymerizable unsaturated group to (b) an emulsion of a polyurethane having active amino groups, and reacting (a) and (b) with each other in the presence of water and at a temperature from 5° C. to 40° C.

The above-mentioned emulsion of a polyurethane having active amino groups can be prepared by emulsifying and dispersing a urethane prepolymer having an isocyanate group at a molecular terminal in water, said urethane prepolymer prepared by reacting a compound having two or more active hydrogen atoms with an organic polyisocyanate. Then, a polyamine having at least two primary amino groups and at least one secondary amino group in the same molecule is added to the emulsion in a sufficient amount such that ratio of the number of moles of terminal isocyanate group of the urethane prepolymer to the number of moles of the primary amino groups of the polyamine is from 1/1 to 1/0.7, and allowing the polyamine and urethane prepolymer to react in the presence of water at temperatures ranging from 5° C. to 40° C.

The above-mentioned isocyanate group-containing compound having a polymerizable unsaturated group can be a compound having, in the same molecule, (1) at least one moiety selected from the group consisting of acryloyl, alkenyl and styryl, and also (2) having at least one isocyanate group.

The ratio of the number of moles of the active amino groups of the above-mentioned emulsion of a polyurethane having active amino groups to the number of moles of the isocyanate group of the above-mentioned isocyanate compound having a polymerizable unsaturated group can be from 1/1.05 to 1/0.8.

The above-mentioned emulsion of a polyurethane having active amino groups can be used in a reaction with the above-mentioned isocyanate compound having a polymerizable unsaturated group, after the organic solvent contained in the emulsion has been removed.

DETAILED DESCRIPTION OF THE PREFERRED EMBODIMENTS

The radiation-curable polyurethane emulsion compositions of the present invention have the following features:

(1) The reaction between the emulsion of a polyurethane having active amino groups and the isocyanate compound having a polymerizable unsaturated group allows introduction of the polymerizable unsaturated group into the polyurethane. Moreover, this reaction proceeds easily in the presence of water at low temperatures, and therefore the conventional process involving heating at a high temperature is not required.

(2) After the organic solvent used in the preparation of the emulsion of a polyurethane having active amino groups has been removed, the above-mentioned method allows the reaction with the isocyanate compound having a polymerizable unsaturated group to occur in the emulsion or in the presence of water. Thus, the method overcomes a problem of the prior art by eliminating the possibility of polymerizing the polymerizable unsaturated group during production of the water-based urethane acrylate. The method does not require the excessive use of an inhibitor. The method, therefore, is very attractive as an industrial production process. Moreover, the product also has excellent curing properties after application to a substrate.

According to the present invention, as described above, an isocyanate having a polymerizable unsaturated group is added to, and reacted with, an emulsion of a polyurethane having active amino groups, and thereby provides a radiation-curable polyurethane emulsion composition. The preparation of an emulsion of a polyurethane having active amino groups facilitates introduction of the polymerizable unsaturated group into the polyurethane. The emulsion of a polyurethane having active amino groups can be prepared from a reaction between: (1) a urethane prepolymer having an isocyanate at the terminal of the molecule and (2) polyamine having, in the same molecule, at least two primary amino groups and at least one secondary amino group. The urethane prepolymer having an isocyanate at a terminal of the molecule is prepared from a compound having two or more active hydrogen atoms and an excess amount of organic polyisocyanate, either in the presence or absence of a solvent.

The above-mentioned compound having two or more active hydrogen atoms can be a compound having, within the molecule or at the terminal ends of the molecule, two or more hydroxyl groups, carboxyl groups, amino groups or mercapto groups. Such compounds include the well-known polyethers, polyesters, polyether esters, polythioethers, polyacetals, polybutadienes and polysiloxanes. In particular, polyethers and polyesters having two or more hydroxyl groups at their terminal ends are preferred compounds. A preferred molecular weight range for the above-mentioned compounds having two or more active hydrogen atoms is from 500 to 5,000. If necessary, glycols, triols and the like, of low molecular weight, such as 1,4-butanediol, 1,6-hexanediol, 3-methyl-1,5-pentanediol, ethylene glycol, butanediol, neopentyl glycol, diethylene glycol, trimethylol propane and cyclohexanedimethanol can be used.

The above-mentioned organic polyisocyanate compound can be an aromatic, aliphatic or alicyclic organic polyisocyanate that has been commonly used and is known in the art. Exemplary, organic polyisocyanates included, but are not limited to, tolylene diisocyanate, diphenylmethane diisocyanate, naphthalene diisocyanate, xylylene diisocyanate, hexamethylene diisocyanate, dicyclohexylmethane diisocyanate, isophorone diisocyanate, hydrogenated xylene diisocyanate and tetramethylxylylene diisocyanate, and mixtures thereof.

After considering the later-described reaction between the urethane prepolymer and the polyamine compound after the prepolymer has been emulsified and dispersed in water, and after considering maintenance of the emulsified and dispersed state, and storage stability, the organic polyisocyanate preferably is an alicyclic polyisocyanate, including, for example, dicyclohexylmethane diisocyanate, isophorone diisocyanate and hydrogenated xylylene diisocyanate, or an organic polyisocyanate compound having a tertiary isocyanate group, such as, for example, tetramethylxylylene diisocyanate. It is also desirable to mix such preferred organic polyisocyanates with an above-mentioned aromatic polyisocyanate, including for example, tolylene diisocyanate, diphenylmethane diisocyanate, naphthalene diisocyanate and xylylene diisocyanate, or with an aliphatic polyisocyanate, including, for example, hexamethylene diisocyanate.

The reaction between the above-mentioned compound having two or more active hydrogen atoms and an excess amount of the organic polyisocyanate is effected by the well-known one-stage or multi-stage polyaddition method at a temperature ranging from 50° C. to 120° C.

In this reaction, when necessary, a reaction control agent, such as phosphoric acid, adipic acid or benzoyl chloride, or a reaction catalyst, such as dibutyltin dilaurate, stannous octoate or triethylamine, can be added to the reaction. Furthermore, an organic solvent that does not react with an isocyanate group can be added during the reaction or after the completion of the reaction. The organic solvent can be, for example, acetone, methyl ethyl ketone, tetrahydrofuran, dioxane, ethyl acetate, toluene or xylene.

According to the present invention, the polyurethane having active amino groups is used in the form of a water emulsion. Hence removal of the organic solvent, described hereinafter, must be considered when selecting an organic solvent. When solvent removal is taken into consideration, it is preferable to use acetone, methyl ethyl ketone or ethyl acetate as the solvent. When the emulsification and dispersion of the urethane prepolymer in water, described hereinafter, also is taken into consideration, it is preferable to use acetone or methyl ethyl ketone as the solvent. Moreover, when control of the reaction between the emulsified and dispersed urethane prepolymer and the polyamine compound, described hereinafter, is taken into consideration, it is preferable to use ethyl acetate as the solvent. Selection of an organic solvent however can be made on a case-by-case basis.

If necessary, a stabilizer, such as an antioxidant, can be added to the reaction either during the reaction or after the completion of the reaction. A preferred antioxidant is a semicarbazide antioxidant because the semicarbazides are relatively less detrimental to the curing properties of the final product of the present invention, or to the radiation-curable polyurethane emulsion when the emulsion is subjected to radiation-induced curing in the final process.

The amount of isocyanate group at the terminal end of the urethane prepolymer preferably is from 0.3 to 3% by weight, and more preferably from 1.0 to 2% by weight, based on the weight of the urethane prepolymer. If the amount of the terminal isocyanate group is greater than 3% by weight, the emulsion is broken during the later-described reaction with the polyamine, and gelation occurs; or product phase stability and storage stability is inadequate. If the amount of terminal isocyanate group is less than 0.3% by weight, the quantity of active amino groups introduced by the polyamine is small. Consequently, the quantity of the isocyanate having a polymerizable unsaturated group, which is introduced in a later reaction, is reduced. This, in turn, reduces the quantity of the polymerizable unsaturated group introduced into the polyurethane. Hence, the improved physical properties of a film resulting from radiation-induced curing of the radiation-curable polyurethane emulsion of the present invention are not exhibited.

The above-mentioned urethane prepolymer having an isocyanate group at the terminal end of molecule is emulsified and dispersed in water. The following methods can be used to emulsify and disperse the urethane prepolymer:

(1) During preparation of the urethane prepolymer, carboxyl groups are introduced, in advance, into the prepolymer molecule by means of a reaction between a polyol component having a carboxyl group, such as dimethylol propionate, and an organic polyisocyanate. Then, the carboxyl group is neutralized with a basic compound, such as triethylamine, trimethylamine, diethanol monoethylamine, dimethyl ethanolamine, sodium hydroxide or potassium hydroxide, to convert the carboxyl group into a salt of the carboxyl group.

(2) During preparation of the urethane prepolymer, an oxyethylene chain is introduced, in advance, in the prepolymer molecule in an amount of 5% to 20% by weight. Then a nonionic surfactant having a hydrophilic-lipophilic balance value of from 6 to 18 is added to and mixed with the ethoxylated urethane prepolymer at 50° C. or less, after the ethoxylated urethane prepolymer has been prepared. After considering both the emulsification and dispersion properties of the final product and the water resistance of a cured film derived from the final product, the amount of nonionionic surfactant added to the urethane prepolymer preferably is from 2% to 15% by weight, relative to the urethane prepolymer.

(3) After preparation of the urethane prepolymer, the urethane prepolymer is reacted with a water solution of the sodium salt or potassium salt of aminoethanesulfonic acid, aminoacetic acid, or similar amino-substituted organic acid, in an amount corresponding to 5 to 50% of the terminal isocyanate groups of the urethane prepolymer, and preferably to 5 to 30% thereof, at a temperature ranging from 5° C. to 50° C., and preferably from 20° C. to 40° C., for 60 minutes.

After any one of the above-described procedures (1), (2) or (3) is completed, water is added to the urethane prepolymer, and an emulsifying and dispersing apparatus, such as homomixer or homogenizer, is used to emulsify and disperse the urethane prepolymer. During emulsification and dispersion, the emulsification and dispersion temperature is maintained at a low level, such as from 5° C. to 40° C., preferably from 5° C. to 30° C., and more preferably from 5° C. to 20° C., in order to suppress a reaction between the terminal isocyanate groups of urethane prepolymer and the water.

Polyamine compounds used in the present invention have, in the same molecule, at least two primary amino groups and at least one secondary amino group. Exemplary polyamine compounds include, but are not limited to, diethylenetriamine, triethylenetetramine, and similar oligomeric polyethylenimines. The amount of polyamine compound is sufficient to provide a ratio of the number of moles of the terminal isocyanate group of the urethane prepolymer to the number of moles of the primary amino group of polyamine compound within a range of 1/1 to 1/0.7. If the ratio is less than 1/1 (i.e., if the number of moles of the number of primary amino groups is too great), an effective increase in the molecular weight of the emulsified polyurethane composition having an active amino group can be inhibited. If the mole ratio is greater than 1/0.7 (i.e., the number of moles of the primary amino groups is too small), the number of active amino groups introduced into the emulsified polyurethane composition can be decreased. Accordingly, the number of polymerizable unsaturated groups introduced into the polyurethane in the next process step also is reduced. Hence, the improved physical properties exhibited by the emulsion composition of the present invention, and films derived therefrom, are decreased. In addition, increased viscosity and gelation of the emulsion composition, which are not desirable, occurs.

An above-described urethane prepolymer is emulsified and dispersed in water. Then, an above-described polyamine compound is added to the emulsified urethane prepolymer, and the terminal isocyanate group of the urethane prepolymer and the polyamine react with one another. To ensure a homogeneous reaction, an emulsifying and dispersing apparatus, such as homomixer or homogenizer, is used. Because gelation can result from a breakdown of the emulsion due to too rapid of a reaction or from a localized reaction, and to maintain phase stability and storage stability, the reaction is conducted at a temperature ranging from 5° C. to 40° C., preferably from 5° C. to 30° C., and more preferably from 5° C. to 20° C. The chain-lengthening reaction between the polyamine and emulsified urethane prepolymer normally is sufficiently completed in 10 to 60 minutes.

In accordance with the present invention, the primary amino groups of the polyamine compound molecule react with an isocyanate group at a faster rate than the secondary amino groups, and therefore the primary amino group selectively react in the chain-lengthening reaction. As a result, the secondary amino groups of the polyamine compound are introduced and positioned into the polyurethane backbone structure. By this method, an emulsion of a polyurethane having active amino groups, which is used in the present invention, is produced. If an organic solvent is present in the emulsion, when necessary, the organic solvent is distilled from the emulsion at a reduced pressure and at a temperature from 30° C. to 70° C. to provide an emulsion of a polyurethane having active amino groups for use in the present invention.

During preparation of the polyurethane emulsion, in order to suppress a side reaction between water and the isocyanate group, and to promote the reaction between the isocyanate group and the polyamino compound, a compound such as phosphoric acid, hydrochloric acid, benzoyl chloride, or a similar compound can be added to the emulsion.

An isocyanate having a polymerizable unsaturated group used in the present invention includes, for example, products of an addition reaction between an organic isocyanate compound, such as, for example, hexamethylene diisocyanate, xylylene diisocyanate, cyclohexylmethane diisocyanate, isophorone diisocyanate, tolyenediisocyanate, and diphenylmethane diisocyanate, or dimers or trimers thereof, and a hydroxyl group-containing compound having an acryloyl group, such as, for example, hydroxyl methacrylate and hydroxyl acrylate and/or alkylene oxide adducts of said compounds, or allyl alcohol and/or alkylene oxide adducts of allyl alcohol. Other examples include 2-methacryloyloxyethyl isocyanate, as expressed by structural formula (1), m-isopropenyl-alpha, alpha-dimethylbenzyl isocyanate as expressed by structural chemical formula (2), and methacryloyl isocyanate as expressed by the structural chemical formula (3).

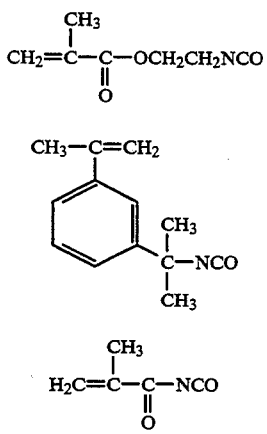

An isocyanate compound having a polymerizable unsaturated group is added, preferably dropwise, to the emulsion of a polyurethane having active amino groups prepared by the above-described method, and the components are mixed and allowed to react with each other.

The addition reaction between the isocyanate compound having a polymerizable unsaturated group and the above-described emulsion of a polyurethane having active amino groups is conducted at a temperature ranging from 5° C. to 40° C., and preferably from 5° C. to 30° C., for 15 to 120 minutes. If the temperature is below 5° C., the reaction between the active amino groups of the emulsified polyurethane and the isocyanate compounds having polymerizable unsaturated group is too slow, and an undesirable side reaction between the isocyanate compound having a polymerizable unsaturated group and water occurs. On the other hand, if the temperature is above 40° C., an undesirable side reaction between the isocyanate compound having a polymerizable unsaturated group and water is induced, and as a result, the rate of reaction between the active amino groups and the isocyanate compound having a polymerizable unsaturated group decreases. This inevitably results in less of the polymerizable unsaturated group being introduced into the urethane backbone.

The addition of the above-described isocyanate compound having a polymerizable unsaturated group is designed such that the ratio of the number of moles of active amino groups in the emulsion of a polyurethane having active amino groups to the number of moles of isocyanate group of the isocyanate compound having polymerizable unsaturated group is from 1/1.05 to 1/0.8. If this ratio is smaller than 1/1.05 (i.e., the moles of isocyanate group is too great), amounts of free urea compounds having a polymerizable unsaturated group and amine compounds having a polymerizable unsaturated group increase due to an undesirable reaction between the isocyanate compound having a polymerizable unsaturated group and water. If the ratio is greater than 1/0.8 (i.e., the moles of the isocyanate group is too small), the quantity of polymerizable unsaturated group introduced into the polyurethane decreases, and the undesirable result is a decrease in the improved physical properties exhibited by the emulsion composition of the present invention, and films derived therefrom. Moreover, if a large amount of active amino groups remain unreacted, the unreacted amino groups intensify burn and yellowing, and adversely affect other properties of the cured film, which is not desirable.

Because of the above-described reaction, the active amino groups present in the polyurethane backbone of the polyurethane emulsion and the isocyanate group of the isocyanate compound having a polymerizable unsaturated group react with each other, and the polymerizable unsaturated group is introduced onto the polyurethane. By this method, the radiation-curable polyurethane emulsion compositions of the present invention are prepared.

One benefit of the method of producing an emulsified polyurethane composition of the present invention at the industrial production level is that the method can easily introduce, with a low energy requirement, a polymerizable unsaturated group into the polyurethane. This is advantageous because the problem of gelation of compounds having a polymerizable unsaturated group in the conventional process is eliminated, and a stable production rate is assured.

The method of producing a radiation-curable polyurethane emulsion composition of the present invention includes preparation of an emulsion of a polyurethane having active amino groups, and the use of the emulsion and an isocyanate compound having a polymerizable unsaturated group. The reaction between the emulsion of a polyurethane having active amino groups prepared and used according to the present invention, and the isocyanate compound having a polymerizable unsaturated group, can be conducted in the presence of water and at relatively low temperatures after removal of the organic solvent used in the preparation of the polyurethane having active amino groups. This provides an easy route for introducing a polymerizable unsaturated group into a polyurethane. Hence, the problem of polymerization or gelation of the polymerizable unsaturated group, which is present in the conventional processes requiring heating at high temperature, can be overcome.

One conventional method of attenuating the polymerization or gelation of the polymerizable unsaturated group is excessive use of an inhibitor. The excessive use of an inhibitor poses problems of a decreased rate of polymerization and deficient crosslinking upon irradiation. The present invention also solves these problems as well.

Because the radiation-curable polyurethane emulsion compositions of the present invention are water-based emulsions, water can be used as diluting medium. Hence, viscosity control and film thickness adjustment are easily made. The use of water, in turn, solves problems arising from the use of a reactive thinner monomer in radiation-curable resins of the prior art to provide viscosity control and film thickness adjustment. The above-mentioned problems associated with a reactive thinner monomer include residual smell, after curing, specific to the monomer, and insufficient adhesion of a film to the substrate caused by cure shrinkage of the resin. The radiation-curable polyurethane emulsion compositions of the present invention can be used in a wide range of applications, such as impregnation and coating of fibers, knit fabrics, woven fabrics, nonwoven fabrics, wood, paper, leather, metals, plastics, and similar substrates, and as a vehicle for paints and inks.

When it is desired to increase the hardness of a cured film, the radiation-curable polyurethane emulsion compositions of the present invention can be used in conjunction with a water-soluble reactive thinner monomer. Such water-soluble reactive thinner monomers include, for example, diacrylates of dimethyl acrylamide, vinylpyrrolidone, ethylene glycol, diethylene glycol, and a diacrylate of a low molecular weight polyethylene glycol.

The radiation-curable polyurethane emulsion compositions of the present invention can be used with other water-based resin emulsions. For instance, they can be used as a modifier for a conventional polyurethane emulsion; emulsions of vinyl acetate, ethylene-vinyl acetate copolymer and acrylic ester resins; natural rubber; and synthetic rubber latexes of SBR or NBR, and similar rubbers. Furthermore, a composition comprising a radiation-curable polyurethane emulsion composition of the present invention and an above-described water-soluble reactive thinner monomer can be used as a modifier for the above and other water-based resin emulsions.

In the following, the present invention is described further with reference to particular embodiments. The present invention, however, is not limited to any of these particular embodiments. The terms "part" and "%" used in the description of the examples, experiments, comparative examples and comparative experiments denote part by weight and % by weight, except as otherwise indicated.

EXAMPLE 1

A polyester polyol (butylene adipate of molecular weight 2,000) (350 parts), trimethylol propane (10.1 parts), polyethylene glycol (molecular weight of 600) (35 parts), PO(propylene oxide)/EO(ethylene oxide) random copolymer polyether polyol (PO/EO=30/70; molecular weight of 3,400) (35 parts), and 1,4-butanediol (78.3 parts) were added to and dissolved in 400 parts of methyl ethyl ketone. The solution was heated to 50° C. and isophorone diisocyanate (310 parts) was added to the solution at a solution temperature of 50° C. Then, dibutylin dilaurate (0.05 part) was added to the solution, and the mixture was slowly heated to a temperature of 75° C. The mixture was allowed to react at 75° C. for 60 minutes. Then, another 0.05 part of dibutylin dilaurate was added to the mixture, and the reaction was allowed to continue at 75° C. for an additional 200 minutes. The mixture then was cooled to a temperature of 50° C. The amount of free isocyanate group in the resulting urethane prepolymer, after cooling to 50° C., was 2.0% (relative to the solid content). Next, at a temperature of 45° C., 80 parts of a poly(oxyethylene) arylphenol ether-type nonionic surfactant (HLB=15), which is ethylene oxide adduct of distyrene phenol, was added to the mixture including the urethane prepolymer, and the resulting mixture was mixed for 10 minutes. Then, the mixture was stirred at a high speed of about 3,000 rpm (revolutions per minute) with a homomixer. Distilled water (1,300 parts) was added gradually into the mixture, and the mixture was emulsified at a temperature of 30° C. for 20 minutes.

The temperature of the resulting emulsion was lowered to 20° C., then a water solution of diethylenetriamine was added to the emulsion. The polyamine solution was prepared by dissolving 18 parts of diethylenetriamine in 130 parts of distilled water. The temperature of the resulting emulsion was maintained in a range of 20° C. to 25° C., and the mixture was stirred at 3,000 rpm with the homomixer for 60 minutes. Next, the solvent methyl ethyl ketone was removed by means of an evaporator operated at reduced pressure and a water bath temperature of 40° C. An emulsified polyurethane composition having active amino groups according to the present invention therefore was prepared.

The emulsified polyurethane composition having active amino groups was analyzed. The results are tabulated in Table 1. The quantity of the active amino groups present in the polyurethane composition was determined by titration with hydrochloric acid using bromphenol blue as the indicator. In particular, 10 parts of the emulsified polyurethane composition were dissolved in 300 parts of N-methyl-2-pyrrolidone. The number of milligrams of potassium hydroxide (mg KOH) equivalent to the number of moles acid required to neutralize one gram (g) of the emulsified polyurethane composition was expressed as amine value (Am.V) in units mg KOH/g.

TABLE 1

| Example 1 | |
|---|---|
| Solids content | 40% by weight |
| Amino value (Am. V) | 3.80 mg KOH/g |
| Appearance | White liquid |

Next, 1,000 parts of the emulsion of a polyurethane having active amino groups prepared as described above was maintained at a temperature of 25° C., and stirred at 1,000 rpm with a homomixer. A solution prepared by dissolving hydroquinone monomethyl ether (0.2 part) in isopropyl alcohol (2 parts) was added to the emulsion. Then, 2-methacryloyloxyethyl isocyanate (10.2 parts) was slowly added to the emulsion, dropwise, over ten minutes. Then, the resulting emulsion was stirred at 25° C. until the measured amine value became constant.

The emulsion was stirred for 60 minutes and the amine value was 0.25 mg KOH/g (for the entire system). The amine value clearly indicates that the active amino groups in the emulsion of the polyurethane having active amino groups reacted with the isocyanate group of 2-methacryloyloxyethyl isocyanate. Thus, a radiation-curable polyurethane emulsion composition, wherein a polymerizable unsaturated group was introduced into the polyurethane in accordance with the present invention, was obtained. The radiation-curable polyurethane emulsion composition was a white liquid, with solids content of 40.2%.

EXAMPLE 2

A polyether polyol (PO/EO copolymer, PO/EO=90/10; molecular weight of 2,000) (350 parts), trimethylol propane (15 parts), polyethylene glycol (30 parts), a PO/EO random copolymer polyether polyol (PO/EO=30/70; molecular weight of 3,600) (40 parts), and cyclohexane dimethanol (150 parts) were dissolved in methyl ethyl ketone (400 parts). Next, isophorone diisocyanate (360 parts) was added to the solution. Then, dibutyltin dilaurate (0.1 part) was added to the resulting solution after the solution temperature was raised to 50° C. The resulting mixture then slowly was heated to a temperature of 75° C. The heated mixture was allowed to react at 75° C. for 300 minutes. Then the mixture was cooled to 50° C. The amount of free isocyanate in the resulting urethane prepolymer, after cooling to 50° C., was 1.80% (relative to the solid content).

Next, at a temperature of about 40° C., 90 parts of the poly(oxyethylene) arylphenol ether-type nonionic surfactant (HLB=15) was added to the urethane prepolymer solution, and the resulting mixture was mixed for 15 minutes. Then, the mixture was stirred at a high speed of 3,000 rpm with a homomixer. Next, 1,690 parts of distilled water was added, slowly, into the mixture, and the mixture was emulsified at a temperature of about 25° C. for 20 minutes.

Next, a water solution of diethylenetriamine, prepared by dissolving 18.7 parts of diethylenetriamine in 100 parts of distilled water, was added to the emulsion while maintaining a temperature of 25° C. While maintaining the temperature in a range of 20° C. to 25° C., the mixture was stirred at 3,000 rpm with the homomixer for 60 minutes. Next, the solvent methyl ethyl ketone was removed by means of an evaporator operated at a reduced pressure and a water bath temperature of 40° C. An emulsified polyurethane composition having active amino groups according to the present invention therefore was prepared.

The emulsified polyurethane composition having active amino groups was analyzed. The results are tabulated in Table 2. The quantity of the active amino groups present in the emulsified polyurethane composition was determined by the method described above in Example 1.

TABLE 2

| Example 2 | |
|---|---|
| Solids content | 38% by weight |
| Amino value (Am. V) | 3.30 mg KOH/g |
| Appearance | White liquid |

Next, 1,000 parts of the emulsion of a polyurethane having active amino groups prepared as described above was maintained at a temperature of 25° C. and stirred at 1,000 rpm with a homomixer. A solution prepared by dissolving hydroquinone monomethyl ether (0.2 part) in isopropyl alcohol (2 parts) was added to the emulsion. Then, 2-methacryloyloxyethyl isocyanate (9.0 parts) was slowly added to the emulsion, dropwise, over ten minutes.

After that, the emulsion was stirred at 25° C. until the measured amine value was constant. The emulsion was stirred for 70 minutes and the amine value was 0.10 mg KOH/g (for the entire system). The amine value clearly indicates that the active amino groups in the emulsion of the polyurethane having active amino groups reacted with the isocyanate group of 2-methacryloyloxyethyl isocyanate. Thus a radiation-curable polyurethane emulsion composition, wherein a polymerizable unsaturated group was introduced into the polyurethane in accordance with the present invention, was obtained. The radiation-curable polyurethane emulsion composition was white liquid, with a solids content of 38.4%.

EXAMPLE 3

1,000 parts of the emulsion of a polyurethane having active amino groups prepared in Example 2 was maintained at a temperature of 25° C., and was stirred at 1,000 rpm by a homomixer. A solution prepared by dissolving hydroquinone monomethyl ether (0.2 part) in isopropyl alcohol (2 parts) was added to the stirred emulsion, and an isocyanate (19.5 parts) having a polymerizable unsaturated group (1:1 mole ratio addition product of 2-hydroxyethyl acrylate and isophorone diisocyanate; isocyanate group content: 12.3%) was slowly added, dropwise, to the emulsion.

The emulsion was stirred at 25° C. until the measured amine value became constant. The emulsion was stirred for 120 minutes and the amine value was 0.15 (for the entire system). The amine value clearly indicates that the active amino groups in the emulsion of a polyurethane having active amino groups reacted with the isocyanate group of the isocyanate having a polymerizable unsaturated group.

Thus, a radiation-curable polyurethane emulsion composition, wherein a polymerizable unsaturated group was introduced into the polyurethane in accordance with the present invention, was obtained. The radiation-curable emulsion composition was a white liquid, with solids content of 39.0%.

COMPARATIVE EXAMPLE 1

A urethane prepolymer having 2% free isocyanate group was prepared in an identical manner as Example 1. Then, the urethane prepolymer was emulsified in the identical manner as described Example 1. A water solution of diethylenetriamine was added to the emulsion as in Example 1, and the emulsion was stirred by a homomixer as in Example 1. As a result, an emulsion of a polyurethane having active amino groups, including methyl ethyl ketone as the solvent, was prepared. The amount of active amino group was measured in the same manner as Example 1. The results are tabulated in Table 3.

TABLE 3

| Example 3 | |
|---|---|
| Solids content | 33% by weight |
| Amino value (Am. V) | 3.10 mg KOH/g |
| Appearance | White liquid |

Next, 1,000 parts of the emulsion of a polyurethane having active amino groups prepared as described above and containing the solvent was maintained at a temperature of 25° C. and stirred at 1,000 rpm with a homomixer. A solution prepared by dissolving hydroquinone monomethyl ether (0.17 part) in isopropyl alcohol (1.7 parts) was added to the emulsion. Then 2-methyacryloyloxyethyl isocyanate (8.4 parts) was slowly added, dropwise, to the emulsion. After that, the emulsion was stirred at 25° C. until the measured amine value became constant. The emulsion was stirred for 60 minutes and the amine value was 0.08.

Next, the methyl ethyl ketone solvent was removed by means of an evaporator operated at a reduced pressure and a water bath temperature of 40° C. The entire emulsion turned into a gel 20 minutes after starting to remove the solvent.

COMPARATIVE EXAMPLE 2

An emulsion of a polyurethane having active amino groups was prepared. The composition and the method of preparation were similar to those of Comparative Example 1 except the quantity of hydroquinone monomethyl ether was 0.68 parts. The emulsion of a polyurethane having active amino groups, wherein the emulsion included the solvent, was reacted with 2-methyacryloyloxyethyl isocyanate. Then, the methyl ethyl ketone solvent was removed by means of an evaporator operated at reduced pressure and a water bath temperature of 40° C. The solvent was removed without any adverse effects. As described above, when a polymerizable unsaturated group is introduced into the polyurethane before removing the solvent, polymerization of the polymerizable unsaturated group is induced during subsequent solvent removal. Therefore, it is necessary to increase the amount of hydroquinone monomethyl ether inhibitor in the emulsion.

COMPARATIVE EXAMPLE 3

A urethane prepolymer having 2% free isocyanate group was prepared and emulsified in the identical manner as described in Example 1. In place of diethylenetriamine, an identical number of moles of ethylenediamine was added to the emulsion, and the resulting emulsion was stirred. Next, by means of an evaporator, the methyl ethyl ketone solvent was removed. As a result, a prior art polyurethane emulsion was prepared. The analytical results of the prior art polyurethane emulsion are tabulated in Table 4. As demonstrated by the amino value in Table 4, the prior art polyurethane emulsion of this comparative example includes almost no active amino groups.

TABLE 4

| Example 4 | |
| --- | --- |
| Solids content | 40% by weight |
| Amino value (Am. V) | 0.10 mg KOH/g |
| Appearance | White liquid |

Experiments 1 through 8

A photosensitizer having the structural formula (4) was added to, and mixed with, each of the radiation-curable polyurethane emulsions prepared in Examples 1 through 3 in order to prepare a film. Films used in the experiments were coated over Teflon plates and dried at room temperature overnight. The films were further dried at 60° C. for two hours. Then, the films were irradiated with ultraviolet rays by means of a high pressure mercury lamp (radiation intensity: 80 W/cm; focal length: 8 cm) to effect photopolymerization and prepare the films. The film thickness of each film was 200 microns.

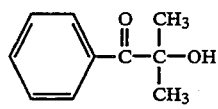

(4)

The physical properties of the cured films were measured. The results are tabulated in Table 5. Experiments wherein no photosensitizer was used are also tabulated in Table 5. The photosensitizer was added in the form of a water solution of photosensitizer of structural formula (4)/poly(oxyethylene) arylphenol ether type nonionic surfactant (HLB=15)/water=10 parts/8 parts/82 parts.

TABLE 5

| | | Film | | | | | | | |
| --- | --- | --- | --- | --- | --- | --- | --- | --- | --- |
| | Radiation-curable polyurethane emulsion | Quantity of added photo-sensitizer (%) | Photo-cure speed (m/min) | Strength (kg/cm$^2$) | Elongation (%) | 100% MO (kg/cm$^2$) | 200% MO (kg/cm$^2$) | Solvent resistance (%) | Water resistance (%) |
| Experiment 1 | Example 1 | 0 | 5 | 190 | 300 | 90 | 150 | 150 | 15 |
| Experiment 2 | Example 2 | 0 | 5 | 100 | 300 | 60 | 80 | 180 | 20 |
| Experiment 3 | Example 3 | 0 | 5 | 110 | 320 | 70 | 75 | 180 | 18 |
| Experiment 4 | Example 1 | 1 | 5 | 350 | 500 | 110 | 210 | 60 | 5 |
| Experiment 5 | Example 1 | 3 | 5 | 352 | 510 | 107 | 215 | 58 | 8 |
| Experiment 6 | Example 1 | 1 | 20 | 300 | 500 | 90 | 170 | 62 | 8 |
| Experiment 7 | Example 2 | 1 | 5 | 200 | 350 | 110 | 140 | 75 | 7.5 |
| Experiment 8 | Example 3 | 1 | 5 | 210 | 340 | 120 | 160 | 73 | 8.0 |
| Comparative Experiment 1 | Comparative Example 2 | 1 | 5 | 250 | 350 | 130 | 160 | 135 | 13 |
| Comparative Experiment 2 | Comparative Example 2 | 1 | 20 | 230 | 310 | 110 | 153 | 140 | 13 |

1)Quantity of photosensitizer used: Quantity of photosensitizer added (%) relative to the 100% of the resin. The photosensitizer used was the compound of structural formula (4).

Comparative Experiments 1 and 2

A photosensitizer was added to the radiation-curable polyurethane emulsion obtained in Comparative Example 2 in an identical manner as Experiments 1 through 8. Photo-polymerization was performed by operations and conditions similar to those of the Experiments 1 through 8. The physical properties of the cured films were measured. The results are tabulated in Table 5.

With respect to the physical properties tabulated in Table 5, strength, elongation, 100% modulus (100% MO) and 200% modulus (200% MO) were measured in accordance with JIS-K-6301. The properties were measured at a stretching rate of 100 mm/min (millimeters per minute) with a tensile tester (Shimazu Seisakusho, trade name "autograph").

Solvent resistance was measured by immersing a film specimen measuring 2 cm (centimeters)×4 cm in a solvent blend of ethyl acetate/toluene=1/1. After the specimen was immersed in the blend for 24 hours at 20° C., the swelling rate (in percentage) of the film surface area was measured. The swelling rate is determined by the following formula:

Film swelling rate =
$$100 \times (\text{area after swelling} - \text{initial area})/\text{initial area}$$

Water resistance was measured similarly to the swelling rate of a film specimen. A film specimen measuring 2 cm×4 cm was immersed in hot 70° C. water for 24 hours. Then the swelling rate of the film surface area was measured. The swelling rate is determined by the above formula.

As a result, it is clearly demonstrated that the radiation-curable polyurethane emulsion compositions of the present invention, and synthesized by the method of the present invention, and films derived therefrom, exhibited improved physical properties as a result of the addition of the photosensitizer and subsequent photo-polymerization. On the other hand, the polyurethane emulsion of Comparative Example 2, which required an increased amount of the inhibitor, exhibited a retarded photo-polymerization reaction because of the increased amount of inhibitor present.

Experiments 9 through 11

Poly(ethylene glycol) diacrylate, a water-based reactive thinner monomer, was mixed with the radiation-curable polyurethane emulsion of the present invention prepared in Example 1. Then, the photosensitizer was added to the emulsion in the same manner as Experiments 1 through 8, and photo-polymerization was performed in the same manner. The physical properties of the films were measured and are tabulated in Table 6. The results of above-described Experiment 4 also are tabulated in Table 6 to illustrate an experiment wherein no reactive thinner monomer was used. The methods for measuring the physical properties tabulated in Table 6 were identical to those of the above-mentioned Experiments 1 through 8.

TABLE 6

|  | Radiation-curable polyurethane emulsion | Quantity of added reactive thinner monomer (%)[1] | Film Photo-cure speed (m/min) | Physical properties | | | | | |
|---|---|---|---|---|---|---|---|---|---|
|  |  |  |  | Strength (kg/cm$^2$) | Elongation (%) | 100% MO (kg/cm$^2$) | 200% MO (kg/cm$^2$) | Solvent resistance (%) | Water resistance (%) |
| Experiment 4 | Example 1 | 0 | 1 | 5 | 350 | 500 | 110 | 210 | 5 |
| Experiment 9 | Example 2 | 10 | 1 | 5 | 400 | 540 | 150 | 300 | 4 |
| Experiment 10 | Example 3 | 20 | 1 | 5 | 450 | 210 | 280 | 440 | 3 |
| Experiment 11 | Example 1 | 30 | 1 | 5 | 500 | 130 | 430 | — | 4 |
| Comparative Experiment 3 | Example 2 | 0 | 0 | 5 | 150 | 500 | 70 | 100 | 18 |
| Comparative Experiment 4 | Example 3 | 10 | 0 | 5 | 165 | 520 | 80 | 110 | 18 |
| Comparative Experiment 5 | Comparative Example 1 | 20 | 0 | 5 | 190 | 470 | 100 | 130 | 17 |
| Comparative Experiment 6 | Comparative Example 2 | 30 | 0 | 5 | 270 | 380 | 120 | 170 | 15 |

[1]Quantity of reactive thinner monomer added: Quantity of reactive thinner monomer added (%) relative to the 100% of the solid content of each radiation-curable polyurethane emulsion.
[2]Quantity of photosynthesizer added: Quantity of photosensitizer added (%) relative to the 100% of the resin. The photosensitizer used was the compound of structural formula (4).

Comparative Experiments 3 through 6

Poly(ethylene glycol) diacrylate, a water-based reactive thinner monomer, was mixed into the polyurethane emulsion of the prior art obtained in Comparative Example 3. Then the photosensitizer was added to the emulsion in the same manner as Experiments 1 through 8. Photo-polymerization was performed by operations similar to those of Experiments 1 through 8. The physical property measurements also are tabulated in Table 6.

As illustrated in Table 6, greater improvements in physical properties of the cured films were achieved when a water-based reactive thinner monomer was added to a radiation-curable polyurethane emulsion of the present invention. This result can be explained, but is not relied upon, as follows. The radiation-curable polyurethane emulsions of the present invention have photo-polymerizable double bonds, therefore crosslinking with the reactive thinner monomer was achieved. This resulted in significant changes in physical properties of the film because of the chemical incorporation of the reactive thinner monomer.

In contrast, when a reactive thinner monomer was added to a polyurethane emulsion of the prior art, and the photo-polymerization was performed, the polyurethane modification was limited to molecular entanglements between the polyurethane and the self-copolymerization product of the reactive thinner monomer because the polyurethane did not contain a photo-polymerizable double bond. As a result, no significant changes in physical properties of the cured film were achieved.

The radiation-curable polyurethane emulsion compositions of the present invention have the following specific advantages:

The compositions are water-based emulsions, therefore viscosity adjustments for adjusting coated-film thickness or similar reasons can be achieved by the addition of water.

From the viewpoint of methods of production, a polyurethane emulsion having active amino groups is allowed to react with an isocyanate compound having a polymerizable unsaturated group. Hence, the introduction of a polymerizable unsaturated group into the polyurethane can be achieved easily even in the presence of water. Accordingly, the possibility of polymerizing the polymerizable unsaturated group due to heating is avoided, thereby overcoming a problem in the conventional art, and a stable product can be made. Therefore, the method of producing a composition of the present invention is extremely useful in industrial scale applications.

As explained above, the introduction of a polymerizable unsaturated group into the polyurethane can be performed with ease in the presence of water. Thus, the introduction of polymerizable unsaturated group into the polyurethane can be done after removal of an organic solvent. Therefore, the method avoids of the problem of gelation, which is encountered in the prior art when a solvent is removed after introduction of polymerizable unsaturated group into the polyurethane. The production method, therefore, is very useful in industrial scale applications.

What is claimed is:

1. A radiation-curable polyurethane emulsion composition prepared by adding an isocyanate compound having a polymerizable unsaturated group to an emulsion of a polyurethane having active amino groups, and allowing the isocyanate compound and the polyurethane to react in the presence of water.

2. The radiation-curable polyurethane emulsion composition of claim 1 wherein the isocyanate compound is added to the polyurethane emulsion at a temperature of 5° C. to 40° C.

3. The radiation-curable polyurethane emulsion composition of claim 1 wherein the ratio of the number of moles of active amino groups of the polyurethane to the number of moles of isocyanate group of the isocyanate compound is from 1/1.05 to 1/0.8.

4. The radiation-curable polyurethane emulsion composition of claim 1 wherein the isocyanate compound includes at least one isocyanate group and at least one acryloyl group, alkenyl group or styryl group.

5. The radiation-curable polyurethane emulsion of claim 1 wherein the isocyanate compound is a reaction product of an organic isocyanate compound and a hydroxyl group-containing compound having an acryloyl group or a styryl group.

6. The radiation-curable polyurethane emulsion of claim 1 wherein the isocyanate compound is selected from the group consisting of 2-methacryloyloxyethyl isocyanate, m-isopropenyl-alpha,alpha-dimethylbenzyl isocyanate, methacryloyl isocyanate, an addition product of 2-hydroxyethyl acrylate and isophorone diisocyanate, and mixtures thereof.

7. The radiation-curable polyurethane emulsion of claim 1 wherein the emulsion of a polyurethane having active amino groups comprises the reaction product of:
   (a) a urethane prepolymer having an isocyanate group at a molecular terminal, wherein said urethane prepolymer comprises:
      (i) a compound having two or more active hydrogen atoms, and
      (ii) an organic polyisocyanate, and
   (b) a polyamine having at least two primary amino groups and at least one secondary amino group per polyamine molecule.

8. The radiation-curable polyurethane emulsion composition of claim 7 wherein the emulsion of a polyurethane having active amino groups is prepared by:
   (a) emulsifying the urethane prepolymer having an isocyanate group at a molecular terminal in water;
   (b) adding the polyamine having at least two primary amino groups and at least one secondary amino group per polyamine molecule to the emulsion of step (a); and
   (c) allowing the urethane prepolymer and the polyamine to react in the presence of water.

9. The radiation-curable polyurethane emulsion composition of claim 8 wherein, in step (b), the polyamine is added to the emulsion of step (a) at a temperature of 5° C. to 40° C.

10. The radiation-curable polyurethane emulsion composition of claim 7 wherein the ratio of the number of moles of the terminal isocyanate groups of the urethane prepolymer to the number of moles of the primary amino groups of the polyamine is in the range of 1/1 to 1/0.7.

11. The radiation-curable polyurethane emulsion composition of claim 7 wherein the urethane prepolymer has 0.3% to 3% by weight terminal isocyanate groups.

12. The radiation-curable polyurethane emulsion composition of claim 7 wherein the urethane prepolymer has 1% to 2% by weight terminal isocyanate groups.

13. The radiation-curable polyurethane emulsion composition of claim 7 wherein the urethane prepolymer comprises a carboxylated urethane prepolymer, an ethoxylated urethane prepolymer, a urethane prepolymer modified with an amino-substituted organic acid, or a mixture thereof.

14. The radiation-curable polyurethane emulsion composition of claim 7 wherein the compound having two or more compound active hydrogen atoms comprises a total of two or more hydroxyl groups, carboxyl groups, amine groups, mercapto groups or mixtures thereof.

15. The radiation-curable polyurethane emulsion composition of claim 7 wherein the compound having two or more active hydrogen atoms is selected from the group consisting of a polyether, a polyester, a polyether ester, a polythioether, a polyacetal, a polybutadiene, a polysiloxane, a glycol, a triol, a polyglycol, a polyol, a polyester polyol, a polyether polyol, and mixtures thereof.

16. The radiation-curable polyurethane emulsion composition of claim 7 wherein the compound having two or more active hydrogen atoms has a molecular weight of 500 to 5,000.

17. The radiation-curable polyurethane emulsion composition of claim 7 wherein the organic polyisocyanate is an aromatic polyisocyanate, aliphatic, polyisocyanate, alicyclic polyisocyanate, or a polyisocyanate mixture thereof.

18. The radiation-curable polyurethane emulsion composition of claim 7 wherein the organic polyisocyanate comprises an alicyclic polyisocyanate, an organic polyisocyanate having a tertiary isocyanate group, or a mixture thereof.

19. The radiation-curable polyurethane emulsion composition of claim 7 wherein the organic polyisocyanate is selected from the group consisting of tolylene diisocyanate, diphenylmethane diisocyanate, naphthalene diisocyanate, xylylene diisocyanate, hexamethylene diisocyanate, dicyclohexylmethane diisocyanate, isophorone diisocyanate, hydrogenated xylene diisocyanate, tetramethylxylylene diisocyanate, and mixtures thereof.

20. The radiation-curable polyurethane emulsion composition of claim 7 wherein the polyamine comprises diethylenetriamine, triethylenetetramine, or a mixture thereof.

21. A radiation-curable polyurethane emulsion composition comprising:
   (a) the reaction product of:
      (i) an isocyanate compound having a polymerizable unsaturated group, and
      (ii) an emulsion of a polyurethane having active amino groups, said polyurethane comprising:
         (A) a urethane prepolymer comprising a compound having two or more active hydrogen atoms and an organic polyisocyanate, and
         (B) a polyamine having at least two primary amino groups and at least one secondary amino group per polyamine molecule; and
   (b) water.

22. The radiation-curable polyurethane emulsion composition of claim 21 further comprising:
   (c) a water-soluble reactive thinner monomer.

23. The radiation-curable polyurethane emulsion composition of claim 22 wherein the water-soluble reactive thinner monomer is selected from the group consisting of a diacrylate of dimethylacrylamide, vinylpyrrolidone, ethylene glycol, diethylene glycol, a low molecular weight poly(ethylene glycol) diacrylate, and mixtures thereof.

24. A solid substrate having the radiation-curable polyurethane emulsion composition of claim 21 applied thereon, wherein the water is removed to form a film.

25. The solid substrate of claim 24 wherein the film is subjected to ultraviolet radiation or electron beams.

26. A solid substrate having the radiation-curable polyurethane emulsion composition of claim 22 applied thereon, wherein the water is removed to form a film.

27. The solid substrate of claim 26 wherein the film is subjected to ultraviolet radiation or electron beams.

* * * * *

UNITED STATES PATENT AND TRADEMARK OFFICE
CERTIFICATE OF CORRECTION

PATENT NO. : 5,360,835

DATED : November 1, 1994

INVENTOR(S) : Sato et al.

It is certified that error appears in the above-identified patent and that said Letters Patent is hereby corrected as shown below:

Column 7, line 25, "nonionionic" should be --nonionic--.

Column 18, line 54, "avoids of the" should be --avoids the--.

Column 20, lines 23-24, "aliphatic, polyisocyanate" should be --aliphatic polyisocyanate--.

Signed and Sealed this

Seventh Day of February, 1995

Attest:

BRUCE LEHMAN

*Attesting Officer*  *Commissioner of Patents and Trademarks*